Dec. 31, 1963
G. A. MARSH ETAL
3,116,117
APPARATUS FOR DETECTING CREVICE CORROSION
AND/OR STRESS CORROSION
Filed March 19, 1958
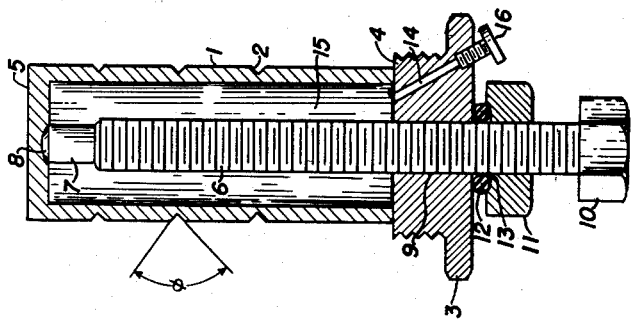
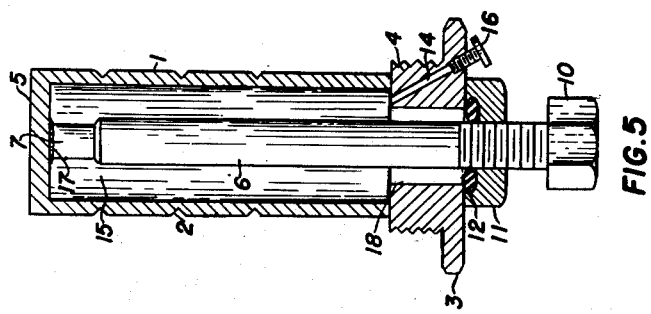
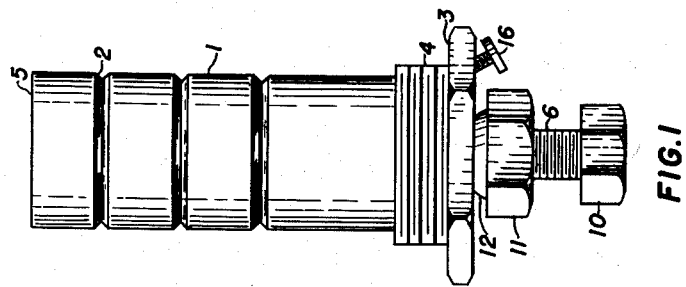
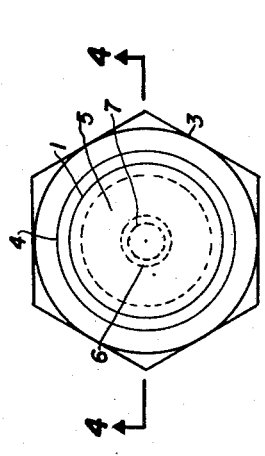
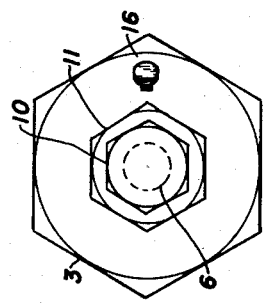
INVENTORS
GLENN A. MARSH
BY EDWARD SCHASCHL
*Edward W. Fang*
ATTORNEY United States Patent Office 3,116,117
Patented Dec. 31, 1963

3,116,117
APPARATUS FOR DETECTING CREVICE CORROSION AND/OR STRESS CORROSION
Glenn A. Marsh and Edward Schaschl, Crystal Lake, Ill., assignors to The Pure Oil Company, Chicago, Ill., a corporation of Ohio
Filed Mar. 19, 1958, Ser. No. 722,566
5 Claims. (Cl. 23—253)

This invention relates to an apparatus for detecting crevice corrosion and/or stress corrosion employing as the detecting element an externally-notched tube made of corrodible material of construction with means for placing a stress or stain on the tube.

Crevice and stress corrosion frequently occur in systems wherein general corrosion is non-existent. In crevice corrosion, as the name implies, the metal in contact with the corrosive environment is attacked at the bottom of the crevices or other sharp depressions in the metal surface. This type of corrosion may occur at the exposed screw threads, or irregularities in the forging. Basically, this is a specific form of cell-type corrosion in that galvanic cells are built up by concentration differences between the main body of fluid or corrosive atmosphere and the fluid or corrosive atmosphere in the crevices. For example, in environments containing dissolved oxygen, the oxygen concentrations in the main body of the corrosive atmosphere and in the crevices may be widely different, in which case the large general metal surface may be cathodic with respect to the relatively small surface area within the crevices or depression. Corrosion proceeds at a high rate within the crevices as compared with the corrosion on the balance of the metal surface.

Stress corrosion is somewhat related to crevice corrosion since intergranular cracks or crevices usually develop as a result of this type of corrosion. Also, crevices may cause a concentration of stresses in a localized area which result in acceleration of the corrosion processes. The stresses may be from internal pressure within the confines of a vessel made up of metallic materials of construction, or may be due to mechanical strain placed on the metal parts through work being done thereon or by rapid motion.

Since both of these types of corrosion are localized and may be occurring at a rapid rate, even though most of the metal surface is not corroding, they cannot be detected by conventional means such as coupons or probes. Accordingly, the various methods and apparatus that have been devised to detect the rates of corrosion by introducing corrodible elements into a corrosive atmosphere, can not be used to detect these types of corrosion. In accordance with this invention, there has been devised a test apparatus for use in detecting the presence of conditions under which crevice and/or strain corrosion occur. If, through use of the present apparatus, these conditions are found to exist, various corrective steps can be taken such as the use of inhibitors and the removal of contributing constituents, such as chloride ions from the environment. Cathodic protection is another corrective step that may follow measurements made with this device.

Accordingly, it becomes a primary object of this invention to provide an apparatus for detecting crevice corrosion and/or stress corrosion.

Another object of this invention is to provide an apparatus for detecting crevice corrosion and/or stress corrosion by employing a detecting means which comprises a circumferentially or longitudinally-notched tube which is also placed under mechanical stress.

These and other objects of the invention will be described or become apparent as the description of the invention proceeds.

The invention is best explained by relation to the drawings in which:

FIGURE 1 is an isometric side view of one form of the apparatus.

FIGURE 2 is an end view of the apparatus shown in FIGURE 1.

FIGURE 3 is a top view of the apparatus shown in FIGURE 1.

FIGURE 4 is a cross-sectional view taken along lines 4—4 in FIGURE 3.

FIGURE 5 is a partial cross-sectional view showing an alternate construction.

Referring to the drawings, there is shown metallic cylinder 1 which is bored and reamed on the inside and finished smooth on the outside. Cylinder 1 is then provided with a plurality of space grooves 2, preferably having a small angular width, which are machined circumferentially about the cylinder and to a predetermined uniform depth. Cylinder 1 is secured to threaded base member or plug 3 having thread-portion 4. The other end of cylinder 1 is closed by means of end-plate 5. Passing longitudinally through plug 3 and cylinder 1 is screw 6 which is adapted to press against end-plate 5. This arrangement is facilitated by providing screw 6 with rounded tip 7 which engages recess 8 in plate 5. As an alternate, both plate 5 and tip 7 may present flat, plane surfaces to each other. Screw 6 passes through a matching threaded opening 9 in plug 3 and has head-nut 10 attached to its extended end. Packing nut 11 enclosing gasket-material 12 within recess 13 serves to seal the juncture between the screw 6 and packing-nut 11. Weephole 14 extends through plug 1 and connects with annular space 15. The outer end of weep-hole 14 is threaded to receive plug-member 16.

As an alternative construction in FIGURE 5, screw 6 may be attached to plate 5 as by weld 17 at tip 7. Threaded hole 9 may be a smooth bore, as indicated at 18, with packing nut 11 used to apply a pulling force thereto by tightening same against base or plug 3.

In use, the device is inserted into a suitably threaded opening provided in the vessel under study and a tensile stress is applied to cylinder 1 by tightening nut 11 to a predetermined torque by means of a torque wrench. Nut 11 is then drawn up to effectuate a seal. The device is left in place in contact with the corrosive atmosphere, while the vessel is placed in service. If a crack, crevice, or hole develops through the cylinder wall at a groove, fluid enters space 15 of the cylinder and flows out through weep-hole 14, thereby indicating failure and the presence of conditions conductive to stress- and/or crevice-type corrosion. Corrective steps are then taken. After failure has occurred, plug-member 16 is inserted in weep-hole 14 and the device is left in place until the vessel can be opened, at which time it is replaced for another test, or the aperture in the process vessel is otherwise sealed.

Although the main body 1 of the device is shown as a cylinder, it may be any desired outer shape having an inner cavity 15 into which the screw 6 can extend. Cylinder 1 may be three-sided, square, hexagonal, oval, or any generally tubular shape. End-plate 5 may be convex, concave, or conical, and need not be flat as shown. Also, weep-hole 14 may be positioned on the side of plug or base member 3. Main body 1 may be machined from one solid piece or fabricated from a pipe or tubing by welding plate 5 thereto. Main body 1 may be welded to base 4 or otherwise attached. The inner bottom of main body 1 may be threaded to engage in an externally threaded extension on plug 3 to effect this attachment.

Main body or tube 1 is constructed with a material to be tested. For this purpose, it may be composed of any material which is subject to corrosion by a corrosive atmosphere. Tube 1 may be a metal, an alloy, cast iron, steel, etc., or a plastic or any other material of construction. Gasket 12 may be rubber, Teflon, nylon or other suitable material.

One advantage of the present invention is that studies of the rate and extent of crevice and/or stress corrosion can be made without the necessity of complicated bridge-measuring circuits, or weighing of samples or coupons. The device is also simple in construction, the parts are interchangeable and the cost of replacing the main body 1 is nominal. The crevices should be relatively steep-sided, that is, angle $\phi$ should be about 10° to about 90°. Various other arrangements of the crevices may be used without departing from the scope of this invention. The depth of metal left between the bottom of the crevice and the inside wall of the main body may be any desired value.

In general, from about $\frac{1}{16}$ to $\frac{1}{4}$ inch of metal is left, depending on the severity of corrosion contemplated and the amount of stress placed on the main body 1 by screw 6. About 1 lb. to as high as 500 lbs. of torque may be applied in tightening up screw 6, same being dependent on the amount of stress desired and the strength and size of the parts employed. For some applications, higher or lower torques may prove useful. The corrosive atmosphere may be liquid, vapor, acidic, caustic, or may comprise any one or combination of organic and inorganic compounds, gases, salts, water, etc., which produce corrosion. A typical application of the device would be in chemical, physical or dynamic processing equipment, such as reactors, stills, condensers, heater tubes, valves, pipes, furnaces, etc.

What is claimed is:

1. A device for detecting stress corrosion comprising a base support member having an axial threaded opening therethrough, an extended tubular test element having one closed end and fastened at the other end to said base member in fluid-tight relationship therewith, a rod extending through said tubular test element and through the opening in said base member, said rod being of sufficient length to internally engage the closed end of said test element and having a threaded portion mating with the threaded opening in said base member, said rod having a head portion extending beyond said threaded portion adapted for engagement with means for rotating said rod to stress said test element.

2. A device according to claim 1 in which the threaded portion of said rod extends externally of the threaded opening in said base member and including a packing nut disposed on said externally extending thread adapted to seal the juncture between said rod and said base member.

3. A device according to claim 2 including a passageway through said base member communicating with the interior of the said tubular test element, and means for closing said passageway.

4. A device in accordance with claim 1 in which a V-shaped groove is provided in the external surface of said tubular test element, said groove extending circumferentially thereof.

5. A device in accordance with claim 4 in which the included angle of said V-shaped groove is in the range of 10° to 90°.

References Cited in the file of this patent

UNITED STATES PATENTS

| | | |
|---|---|---|
| 2,752,228 | Gould | June 26, 1956 |
| 2,763,534 | Campbell | Sept. 18, 1956 |
| 2,928,726 | Oberly | Mar. 15, 1960 |

OTHER REFERENCES

Schroeder et al.: Metals Technology, January 1936, Technical Publication #691. (Copy in Lib. TN/1/M63.)